3,197,364
SUBSTITUTED 1-NAPHTHYL N-METHYLCARBA-
MATE INSECTICIDE

John R. Kilsheimer, South Charleston, W. Va., and Herbert H. Moorefield, Raleigh, N.C., assignors to Union Carbide Corporation, a corporation of New York
No Drawing. Original application Dec. 30, 1960, Ser. No. 79,523, now Patent No. 3,099,681, dated July 30, 1963. Divided and this application Apr. 26, 1963, Ser. No. 280,482
6 Claims. (Cl. 167—32)

This application is a division of application Serial No. 79,523, filed December 30, 1960, now U.S. Patent 3,099,681.

This invention relates to new chemical compounds and to insecticidal compositions containing them. More particularly, this invention relates to substituted 1-naphthyl N-methylcarbamates and to insecticidal compositions containing the same.

The compounds of this invention can be represented by the following formula:

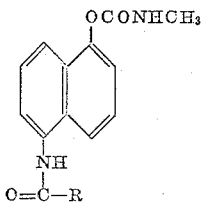

wherein R is a lower alkyl radical. Particularly preferred are the compounds wherein said alkyl radical contains up to 5 carbon atoms. Examples of such compounds include 1-(5-acetamidonaphthyl) N-methylcarbamate, 1-(5-propionamidonaphthyl) N-methylcarbamate, 1-(5-butyramidonaphthyl) N-methylcarbamate, 1-(5-valeramidonaphthyl) N-methylcarbamate, 1-(5-caproamidonaphthyl) N-methylcarbamate, and the like.

The compounds of this invention can be prepared generally by reacting the appropriate substituted 1-naphthol with phosgene in the presence of a base to form the corresponding chloroformate. The chloroformate is then reacted with monomethylamine to form the substituted 1-naphthyl N-methylcarbamate. This synthesis can be graphically represented by the following equations:

Step A:

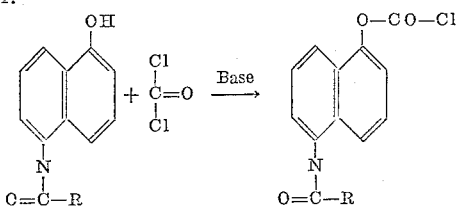

Step B:

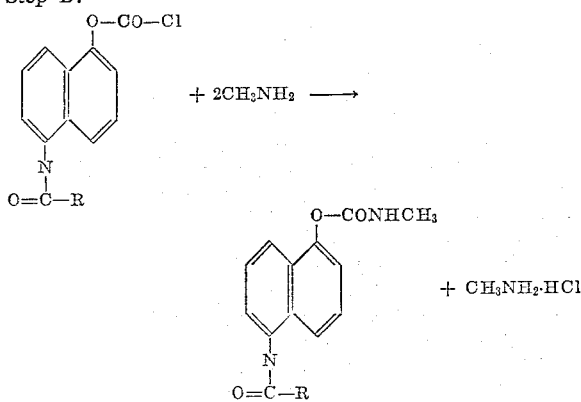

Step A can be conducted at a temperature of from about −30° C. to about 175° C. The reaction can be initiated by adding phosgene dissolved in toluene, benzene, or other suitable organic solvent, to an aqueous solution of the substituted naphthol and a base, preferably sodium hydroxide. The reaction is generally exothermic so that some external cooling is usually necessary. This reaction can be conducted in the presence of basic compounds other than sodium hydroxide, such as pyridine and dimethylaniline, to facilitate removal of hydrogen chloride as an organic hydrochloride. In these cases the reaction can be advantageously conducted in anhydrous solvents, such as toluene, dioxane and the like.

Step B can be conducted at a temperature of from about −30° C. to about 100° C. The chloroformate can be added to a solution of methylamine in a solvent such as water, benzene, hexane, dioxane and toluene.

When the products are crystalline solids they can be separated from the reaction mixture by filtration or centrifugation and dried. In other cases the solvent is removed by distillation and the product is taken as a residue.

An alternate procedure for the preparation of the compounds of this invention is by the reaction of the appropriate substituted 1-naphthol with methyl isocyanate, as represented by the following schematic equation:

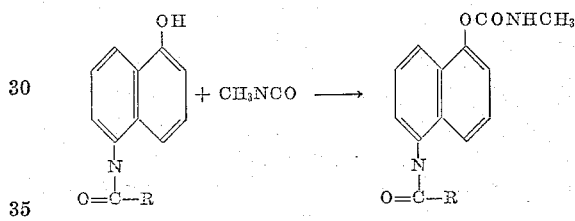

This reaction is conducted by reacting the appropriate naphthol with methyl isocyanate in the presence of an anhydrous, inert solvent and a catalyst in a pressure vessel under autogenous pressure and at from about ambient temperatures to about 200° C. The solvent is distilled off from the reaction mixture, leaving as a residue the methylcarbamate. The catalyst can be an organometallic compound such as dibutyl tin diacetate or an organic tertiary amine such as pyridine. Applicable reaction solvents are ethyl ether, benzene, dioxane and the like. The methylcarbamates can recrystallized from solvents such as xylene, petroleum ether, benzene, methanol, and mixtures thereof.

The following examples are illustrative of the preparation of the compounds of this invention:

EXAMPLE I.—1-(5-ACETAMIDONAPHTHY)
N-METHYLCARBAMATE

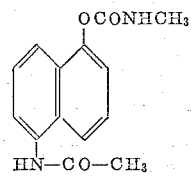

A mixture of 121 grams of 5-acetamido-1-naphthol, 3 grams of dibutyl tin diacetate, and 500 milliliters of dioxane was charged to a reaction vessel and was heated at 25° C., after which 31.3 grams of methyl isocyanate were added to the reaction mixture over a period of 30 minutes. The resulting mixture was held at 25° C. with agitation for three days, after which the dioxane was distilled off. The solid residue remaining in the reaction vessel was heated with methanol to the boiling point and then cooled to −40° C. Crystals of 1-(5-acetamidonaphthyl) N-methylcarbamate that formed upon cooling were filtered from the alcohol and dried. The crystals melted at 212° C. and analyzed as follows: N, 10.5 percent (calculated: N, 10.8 percent). The structure of the 1-(5-acetamidonaphthyl) N-methylcarbamate was confirmed by infra-red analysis.

EXAMPLE II.—1-(5-BUTYRAMIDONAPHTHYL) N-METHYLCARBAMATE

Employing the procedure of Example I, 1-(5-butyramidonaphthyl) N-methylcarbamate is prepared by reacting 5-caproamido-1-naphthol with methyl isocyanate in the presence of dioxane and dibutyl tin diacetate.

The compounds of this invention are useful as insecticides. They are particularly effective as insecticides against Mexican bean beetles and house flies, as is evidenced by the following tests.

A stock formulation of 1-(5-acetamidonaphthyl) N-methylcarbamate was prepared by mixing 100 milligrams of the compound with 10 milliliters of acetone and 10 milligrams of a dimeric alkylated aryl polyether alcohol commercially sold as a wetting agent. This mixture was then diluted with water to give 100 milliliters of the standard insecticidal solution. Lower, graded, test concentrations were prepared by diluting the standard stock solution with water to give the desired concentration. The solutions, containing various concentrations in a dilution series, were then tested on Mexican bean beetle larvae and house flies. Percent mortality of the test insects was plotted against the toxicant concentration on logarithmic probability paper. The concentration in milligrams of toxicant per 100 milliliters of solution needed for 50 percent mortality ($LD_{50}$ value) is interpolated from a line drawn through the points so plotted.

Mexican beam beetle leaf dip test

The test insects were fourth instar larvae of the Mexican bean beetle (*Epilachna varivestis* Muls.) that had been reared on Tendergreen beans at a temperature of 80° F.± 5° F. and a relative humidity of 50 percent±5 percent. Four randomly selected larvae were placed in a 9-cm. Petri dish containing a leaf of a Tendergreen bean plant. The leaves were prepared by excising paired seed leaves from the bean plants and dipping the excised leaves in test solutions prepared according to the above directions until thoroughly wetted. Excess liquid was removed from the surface of the leaf by gentle shaking. The leaves were then dried in a ventilated hood. Wilting of the leaves during drying was prevented by placing the leaf stems in water. The dried, paired leaves were then separated and a single leaf was placed in a Petri dish lined with filter paper. After placing the leaf and larvae in the Petri dishes, the dishes were closed, labeled, and held at 80° F. to 85° F. for three days. Although the larvae could easily consume the whole leaf within twenty-four to forty-eight hours, no additional leaves were added. Larvae exposed to untreated leaves remained vigorous during the entire holding period and did not advance to the quiescent prepupal state. Larvae which were unable to move the length of the body, even upon prodding, were considered dead.

Fly bait test

The test insects were four to six-day old adult house flies (*Musca domestica* L.) that were reared according to the specifications of the Chemical Specialties Manufacturing Association [Blue Book, MacNair-Dorland Company, New York, pages 243–244, 261 (1954)], at a temperature of 80° F.±2° F. and a relative humidity of 50 percent±5 percent. The adult flies were anesthetized with carbon dioxide and twenty-five of such flies were placed under a hemispherical wire cage approximately 5 inches in diameter and 3 inches high, which was inverted over a sheet of white blotting paper measuring six inches by six inches on which was placed a bait cup containing a one-inch square pad of commercially available cellulose absorbent material.

Fifteen milliliters of a test formulation prepared as described above, to which had also been added 10 percent by weight of sugar, was added to the bait cup. The flies were kept at a temperature of 80° F.±5° F. and a relative humidity of 50 percent±5 percent for twenty-four hours. Flies which showed no sign of movement on prodding after the twenty-four hour period were considered dead.

The results of the above-described tests are set forth in Table I below.

TABLE I

| Compound | $LD_{50}$ Values, mg./100 ml. | |
|---|---|---|
| | Mexican bean beetle | House Fly |
| Acetamidonaphthyl N-methylcarbamate | 1 | 12 |

From Table I it can be seen that 1-(5-acetamidonaphthyl) N-methylcarbamate is insecticidally active toward the Mexican bean beetle and house flies. Furthermore, the compounds of this invention are stable in the presence of light and air.

The compounds of the instant invention can be applied to plants or other areas to be protected by contacting such area with a compound of the instant invention in an undiluted form, as a dust when admixed with finely powdered inert carriers, or in a liquid form. The rate of application can vary from about 0.5 to about 5 pounds of the compound per acre.

When the compounds of the instant invention are applied as dusts they can be mixed with suitable particulate extenders, such as clay, chalk, talc, diatomaceous earth, pyrophyllite, infusorial earth, fuller's earth, pumice, bentonite, and flours, such as cotton seed flour and walnut shell flour.

The application of the instant compounds in a liquid medium can be accomplished in any of several ways. For example, a compound of this invention can be directly dispersed in a liquid carrier such as water, petroleum distillates and the like with or without the use of surface active agents.

Another method of preparation of liquid compositions containing the compounds of this invention is to first prepare a liquid concentrate containing such components by dissolving said compound in a solvent such as acetone, toluene, xylene or kerosene. This liquid concentrate can then be added to water together with suitable surface active dispersing agents whereby the compounds of the instant invention are dispersed in the water.

A third method of preparing liquid compositions containing the instant compounds is to prepare a wettable powder by dispersing said compounds on or in a finely divided inert solid such as clay, talc, chalk, bentonite, fuller's earth and the like. These compositions may also contain dispersing or wetting agents as desired. These compositions can then be mixed with water to provide a liquid insecticide suitable for application to the areas to be treated.

The surface active agents that can be employed in the above-described compositions can be any of the known anionic, cationic and non-ionic wetting, emulsifying and dispersing agents, such as aralkyl polyether alcohols, aralkyl polyether sulfonates, aralkyl polyether sulfates, quaternary ammonium compounds and the like. When these surface active agents are employed they generally comprise from about 0.5 percent to about 5 percent by weight of the total composition.

We claim:
1. An insecticidal composition comprising a compound having the structural formula:

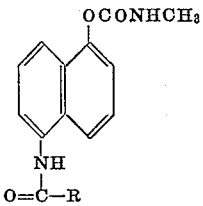

wherein R is a lower alkyl radical, and a carrier therefor.

2. An insecticidal composition comprising 1-(5-acetamidonaphthyl) N-methylcarbamate and a carrier therefor.

3. The process for killing insects which comprise applying an insecticidal amount of a compound having the structural formula:

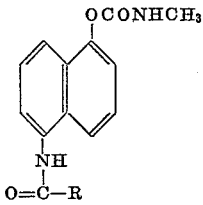

wherein R is lower alkyl radical to a locus to be protected.

4. The process for killing insects which comprises applying an insecticidal amount of 1-(5-acetamidonaphthyl) N-methylcarbamate to a locus to be protected.

5. The process for killing insects which comprises applying an insecticidal amount of a compound having the structural formula:

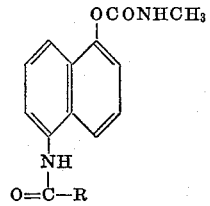

wherein R is a lower alkyl radical to said insects.

6. The process for killing insects which comprises applying an insecticidal amount of 1-(5-acetamidonaphthyl) N-methylcarbamate to said insects.

References Cited by the Examiner

UNITED STATES PATENTS

| | | |
|---|---|---|
| 2,493,710 | 1/50 | Aeschlimann et al. |
| 2,776,197 | 1/57 | Gysin et al. |
| 2,903,478 | 9/59 | Lambreck. |
| 2,904,464 | 9/59 | Moorefield. |
| 2,904,465 | 9/59 | Moorefield. |
| 3,037,993 | 6/62 | Shulgin. |

FOREIGN PATENTS

| | | |
|---|---|---|
| 578,169 | 6/59 | Canada. |

JULIAN S. LEVITT, *Primary Examiner.*